Jan. 13, 1970          T. WILDI          3,489,913
LOAD-CONTROL AND POWER-DISTRIBUTING SYSTEM
Filed Aug. 2, 1968          5 Sheets-Sheet 1
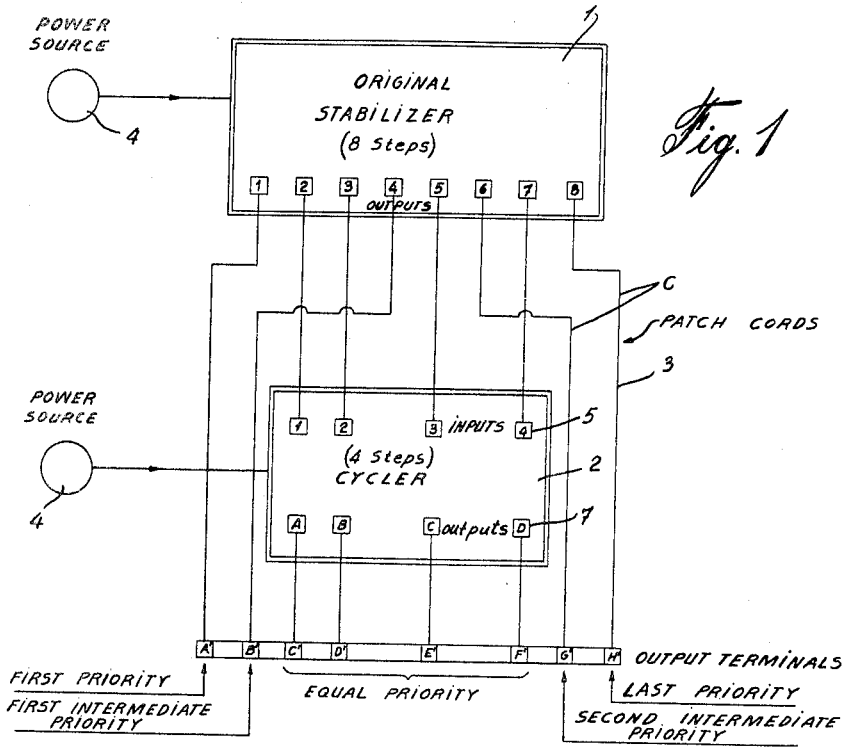
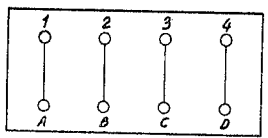
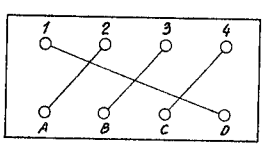
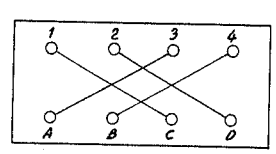
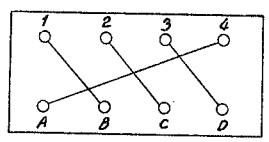
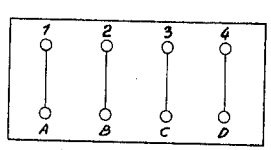
INVENTOR
Theodore. WILDI
ATTORNEY INVENTOR
Theodore WILDI
ATTORNEY INVENTOR
Theodore WILDI

ATTORNEY

Jan. 13, 1970 T. WILDI 3,489,913
LOAD-CONTROL AND POWER-DISTRIBUTING SYSTEM
Filed Aug. 2, 1968 5 Sheets-Sheet 5

INVENTOR
Theodore WILDI

United States Patent Office 3,489,913
Patented Jan. 13, 1970

3,489,913
LOAD-CONTROL AND POWER-DISTRIBUTING SYSTEM
Theodore Wildi, 1365 Rue de Longueuil, Quebec, Quebec, Canada
Filed Aug. 2, 1968, Ser. No. 749,822
Int. Cl. H02j 1/00, 3/00
U.S. Cl. 307—41                                9 Claims

ABSTRACT OF THE DISCLOSURE

The present application concerns a multiple load-control and power-distributing system in which the load-control is set to a specific desired demand and the power-distributor evenly distributes the available power to a number of loads, and arranged such that optional load priorities are obtained by connecting some of said loads directly to said load-control and by connecting the remainder of said loads to said load-control via said power-distributor.

---

This invention relates to a load-stabilizer-cycler combination, and more particularly to a load-control and power-distributing system with optional load priorities.

The description of a load-stabilizer having a sequential order of priority was described previously in applicant's U.S. Patents Nos. 3,133,202 dated May 12, 1964, and 3,291,998, dated Dec. 13, 1966. This stabilizer has been successfully applied in a number of different basic applications, but has also been somewhat limited in certain specific fields, namely that of space heating.

In certain applications, it is desirable to give equal priority to all the loads connected to the stabilizer. In other applications, it is desirable to have equal priority for some loads, a higher priority for others and a much lower priority for loads of lesser importance. This optional choice of priority levels is fulfilled by the stabilizer-cycler combination which will shortly be described.

The new load-stabilizer itself is identical to the ones previously described in the above-mentioned patents, at least as far as basic principles are concerned. In addition, a switching device called a cycler is incorporated into the unit so as to obtain the optional load priorities.

In order to understand the usefulness of the new load-stabilizer with cycler which is about to be described, it would be helpful to, initially, consider some of the areas to which this invention applies.

One of these areas is space heating of commercial and industrial buildings, and in regard thereto this invention makes use of the large thermal time constant inherent in these buildings. This thermal time constant which is of the order of 60 to 150 hours, depending upon the size and type of construction, permits a significant lowering of the electrical demand when the space heating system is controlled. These time constants can be substantiated by theoretical considerations apart from the fact that their actual value was measured on a number of buildings. The large thermal time constant permits us to reduce the electrical demand for two principal reasons as explained in (a) and (b) below.

(a) Compared to the duration of the thermal time constant, the daily temperature changes are very rapid indeed. Temperature swings of as much as 40° Fahrenheit have been registered during winter periods in as little as six hours' time. In view of the fact that the outside temperature changes much more quickly than the time corresponding to the thermal time constant of a building, it is possible to reduce the heating demand significantly below the values which are usually employed, based on the lowest temperature attained during the winter. The reason is that the building heat storage tends to dampen out the effects of outside temperature variations so that it is not necessary to apply the full installed heating power when the outside temperature drops to its predicted lowest value.

(b) It is known that essential service loads such as lighting, stoves, and most electromechanical machines, all give off heat in amounts exactly equal to the active electric power (in kw.) which they consume. These types of loads contribute to the total building heat just as much as standard space heaters, and consequently, when these essential loads come on, the space heating load can be reduced by an equal amount (so as to maintain a constant demand), without affecting the comfort of the occupants.

If the space heating load is not reduced as soon as the essential loads come on, then these loads will cause the demand meter to register a higher demand than it otherwise would. Here again, the large thermal time constant of the building permits such temporary disconnection of space heaters without affecting resident comfort.

Heating consultants usually introduce safety factors in calculating the installed heating capacity. The use of a load stabilizer to control the heating load makes it possible to maintain comfortable conditions in a building with the demand set at exactly that value which is required. This demand is always smaller than the installed heating capacity (in kw.) and as a result the cost of electric heating can be reduced to its minimum possible value.

The conditions which exist during the spring and fall are such that demands as high as those in winter can be attained especially if the windows are opened. By readjusting the demand setting of the stabilizer during these periods, it is possible to maintain a demand consistent with the temperature requirements of each season.

Due to the fact that comfort levels must usually be the same throughout an entire building, it is essential that the individual heating zones have equal priority when they are controlled. For this reason, the stabilizer as previously described is not entirely satisfactory for space heating load control, and must be modified to give equal priority to each heating zone.

On the other hand, certain loads may require a higher or a lower priority than the heating zones, and this is rendered possible by using a stabilizer and cycler combination so as to obtain a very flexible order of priority control.

Further objects, features and principles embodied in the present invention will be apparent from the following detailed description and drawings, in which, FIGURE 1, in general, shows a load-stabilizer cycler-control system according to the invention and adaptable to a building in which the load has been divided into eight zones having different priorities;

FIGURES 2a–2e show the switching sequence of the cycler in which each input terminal is successively connected to each output terminal;

Figure 5:
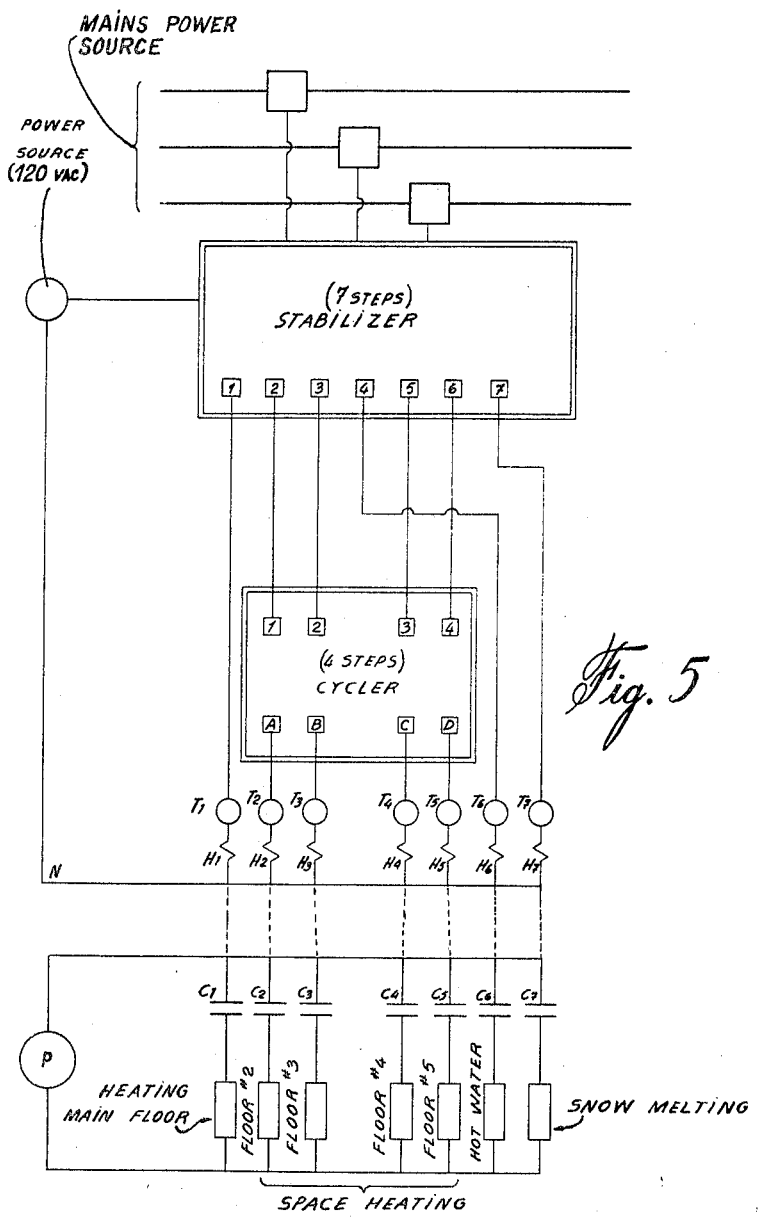
Figure 6:
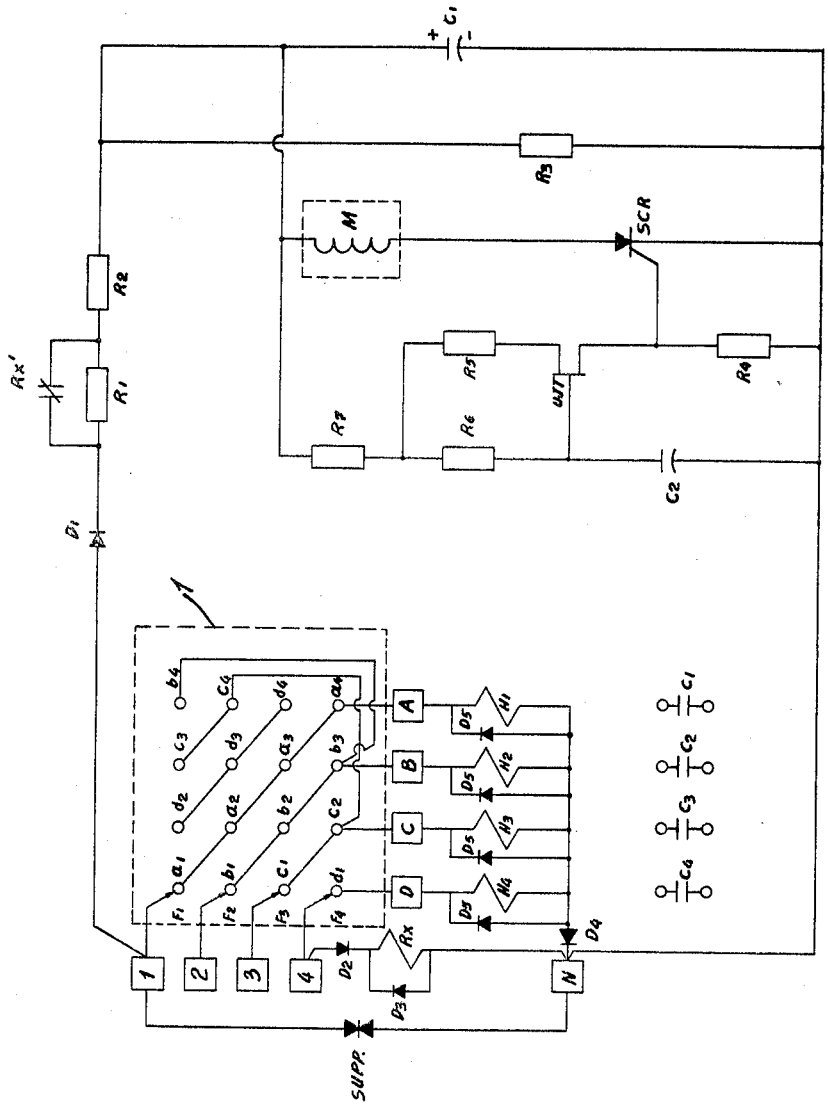

FIGURES 4a–4f in detail, show the operation-mode of the stabilizer-cycler combination in conjunction with thermostats and further illustrates the various heating zones in operation when one or more switches in the stabilizer are closed;

FIGURE 5, by way of example, schematically shows the stabilizer-cycler combination according to the invention, and incoporated in a multi-story building having a number of loads with variable priority;

FIGURE 6, shows the circuit diagram of the internal circuit of the cycler unit.

The principal elements of the new stabilizer-cycler combination, shown in FIGURE 1, are seen to consist of:

The original load stabilizer 1, already described in above mentioned patents;

A cycler 2 which will be described hereinafter; and

A system 3 of patch cord connections.

The stabilizer 1 and cycler 2 are powered from a convenient source 4 and for explanatory purposes, it is assumed, as illustrated, that an eight-step stabilizer and a four-step cycler are employed. As in all standard stabilizers of the type previously described, the output terminals are energized in the numerical sequence 1, 2, 3, 4, 5, 6, 7 and 8 and deenergized in the sequence 8, 7, 6, 5, 4, 3, 2 and 1. The number of terminals energized at any one time depends upon the total electrical load and the demand setting.

The cycler operates in such a way that the output terminals C′, D′, E′ and F′, will all have equal priority. Since terminal A′ is connected directly to terminal 1 of the stabilizer, it has first priority; and, in the same manner, terminal H′ has last priority.

Terminals B′ and G′ on the other hand will have intermediate priority. Thus terminal B′ will only become excited after terminal A′ is fully energized and terminals C′, D′, E′ and F′, have become energized 50% of the time. The operation of the system will become clearer after the behaviour of the cycler has been described.

The cycler shown in FIGURE 1 has four input terminals 1, 2, 3 and 4 and four output terminals A, B, C and D and is consequently a four-step cycler. A ten-step cycler would have ten input terminals and ten output terminals. The cycler is essentially a simple switching device in which each input terminal is successively connected for equal times to every output terminal. The switching action is accomplished by a suitable motor or relays activated by a power source, which will be described hereinafter.

The switching sequence is shown in FIGURE 2 and it can be seen that each output terminal is indeed successively connected to every output terminal in the sequence 2a, 2b, 2c, 2d. The dwell times are also identical so that the connection shown in FIGURE 2a lasts for exactly the same time as the connections for 2b, 2c and 2d. It is useful to define here the so-called "period" of the cycler. The period is the total time required to effect all the different connections. For instance, if the period for the cycler in FIGURE 2 is one hour, then the time for each connection will be fifteen minutes. On the other hand if the cycler had twelve steps instead of four, each connection would last for five minutes, the period still being one hour.

Another feature of the cycler is that the switching from one set of connections to the next is done very rapidly. In other words, the transfer from one set of connections such as shown in FIGURE 2a to the next set of connections, FIGURE 2b, is done very quickly. The reason for this is that the output terminals of the cycler are usually connected to the holding coils of magnetic contactors, and the switching from one set of connections to another should not cause a momentary drop-out of these contactors.

The period of a cycler can of course have any value, but for space heating applications in commercial and industrial buildings having thermal time constants in excess of 60 hours, a period of 30 minutes to one hour is quite satisfactory.

Since the stabilizer is used in conjunction with a cycler, it is useful to recall that the terminals of the stabilizer are switched in or out, (depending upon the load conditions), at approximately five-second intervals. In other words, the switching rate of the stabilizer when the load so requires it, is very much faster than the normal switching rate inherent in a cycler.

Figure 3:
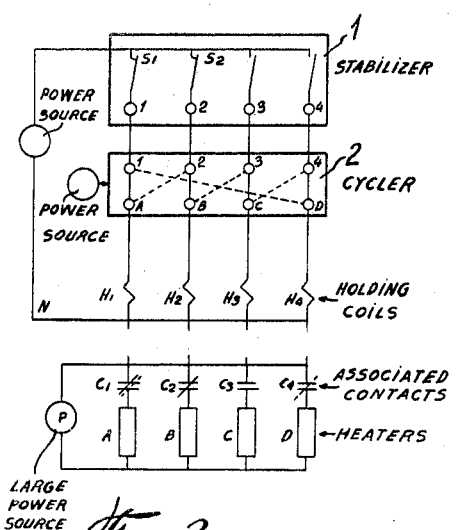
FIGURE 3 shows an elementary circuit of a four-step stabilizer operating in conjunction with a four-step cycler and heater and illustrating the conditions which apply when two switches in the stabilizer are closed.

FIGURE 3 shows, with respect to the following description of operation-part 1, an elementary circuit of a four-step stabilizer 1 operating in conjunction with a four-step cycler 2. The switches in the stabilizer will close or open depending upon the load conditions, and the cycler operates in the same manner as previously described. It can be seen that the holding coils H1, H2, H3 and H4 of the magnetic contactors will be energized when the circuit is completed through the cycler and the stabilizer. These holding coils cause their associated contacts C1, C2, C3 and C4 to close which will then cause elements A, B, C and D to heat. Since at present only the operation principles are being discussed, the internal circuits of the cycler and the stabilizer are not shown. Initially, reference will be made to the operation of the unit when one or more switches in the load stabilizer are closed.

Consider for example, the case where only switch number S1 of the stabilizer is closed thus establishing a voltage between point N and terminal 1 of the cycler. Assuming that a switching sequence is as shown in FIGURE 2, it can be seen that holding coil H1 and consequently heater A will be in operation for a certain time depending upon the period of the cycler. Thus, if the cycler has a period of one hour then heater A will be in operation for fifteen minutes (sixty minutes divided by four steps equal fifteen minutes). Due to the fact that terminal 1 of the cycler is connected successively to terminals A, B, C and D as shown in FIGURE 2, it is evident that the four heaters will be powered successively for fifteen-minute intervals. Averaged over a relatively long period, it can be seen that the power given off by each heater will be one quarter of its rated value when it is in operation continuously.

FIGURE 3 further shows with respect to the following description of operation—part 2, the conditions which apply when two switches S1 and S2 in the stabilizer are closed. Following again the switching sequence as outlined in FIGURE 2, it can be seen that the holding coils H1 and H2 will cause contacts C1 and C2 to close and heaters A and B to heat for a fifteen-minute period. Subsequent to this interval, a rapid switching action of the cycler takes place and new connections are established, as shown in dotted lines in FIGURE 3. In this case, heaters A and D are in operation. Furthermore, it is also clear why the switching action of the cycler should be rapid, for if it had been slow, holding coil H1 would have been deenergized for a significant length of time causing its contact C1 to release and reclose immediately after the connection indicated in dotted lines in FIGURE 3 had been definitely established. This momentary opening of the contacts C1, C2, C3 and C4 would cause unnecessary deterioration due to arcing.

It can also be seen from FIGURE 3 that there will always be two heaters in operation at any given time, and that each heater will be in operation twice as long as in operation description—part 1. In consequence, the power given off by each heater over an extended period of time will be equal to one half of its rated capacity under normal continuous voltage conditions.

The argument can now be extended to the case where three switches in the stabilizer are closed and it can readily be proved that each heater will be in operation for three quarters of the period of the cycler, that is to say, for three quarters of an hour every hour. The operation of the cycler is therefore to give equal priority to the four loads, and if these four loads are represented by heating zones on four different floors in the building it is clear that the available heating power will be evenly distributed throughout the premises.

Figure 4A:
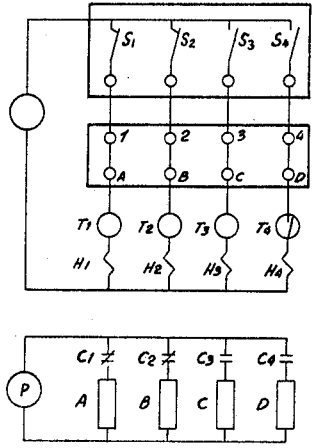
Figure 4B:
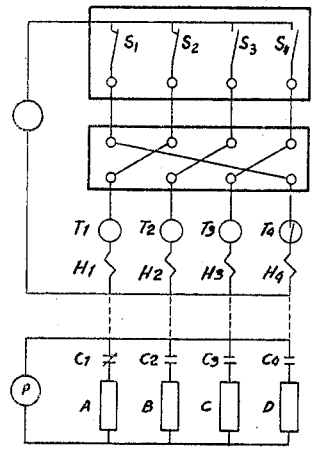

Consider now with respect to the following description of operation—part 3, the circuit of FIGURE 4a which is identical to that of FIGURE 3 with the exception that thermostats T1, T2, T3 and T4 have been added in series with the respective holding coils. These thermostats are respectively located in the zones where heaters A, B, C and D are located. If all the thermostats are closed the operation will be such as to distribute power evenly to the four heating zones as previously described in part 2.

Consider however the case where one thermostat, such as T4, is open and that two of the switches in the stabilizer are closed. It should be remembered that the closure of the switches in the stabilizer is dependent upon the total load conditions, and if the load is below the preset value, then more switches will automatically close. Conversely, if the load is above the preset value the switches will automatically open in inverse sequence. The opening and closing of the switches in the stabilizer is very rapid compared to the switching action of the cycler so that to all intents and purposes, it can be assumed that the stabilizer switching time is negligibly short.

In following the same cycler switching sequence as shown in FIGURE 2 and beginning with switching sequence 2a the following action will result: referring to FIGURE 4a, it is clear that the opening of thermostat T4 will have no effect upon the operation, and contacts C1 and C2 will cause zones A and B to heat for a 15-minute interval, if the period of the cycler is 60 minutes. Subsequent to this 15-minute interval, the cycler suddenly switches to the configuration shown in FIGURE 4b, but zone D will not heat because the thermostat T4 will not permit holding coil H4 to become excited. As a result, the only zone which is heated at this moment is zone A and the load into the building falls below the preset value with the result that the stabilizer will immediately start to close the next switch S3.

Figure 4C:
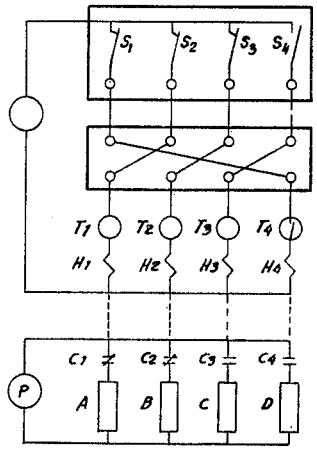

This switch closure shown in FIGURE 4c immediately results in the closure of holding coil H2 and heating of zone B. Since the total heating load is the same as in FIGURE 4a, the stabilizer will not attempt to close any more switches.

It will be noted that the time during which only one heater is in operation is very short, being only equal to the interval required to close the next switch in the stabilizer. Since this time interval is in the order of a few seconds one can say that for practical purposes, the total load has remained constant.

Figure 4D:
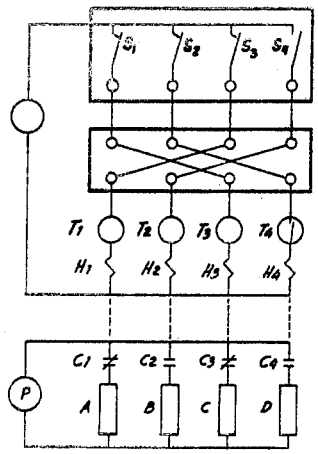

After the connection in FIGURE 4c has been in operation for a 15-minute period, it suddenly switches to that shown in FIGURE 4d and now zones A and C are in operation and load B has dropped out. Since the total heating load is still equal to that represented by two zones, the stabilizer will maintain its three switches closed as indicated.

Figure 4E:
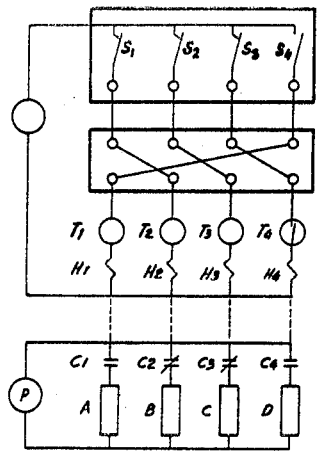

Fifteen minutes after the connections of FIGURE 4d have been established, the cycler suddenly switches to the configuration shown in FIGURE 4e and now zones B and C are heating. The three switches of the stabilizer still remain closed because the total load is still the same.

Figure 4F:
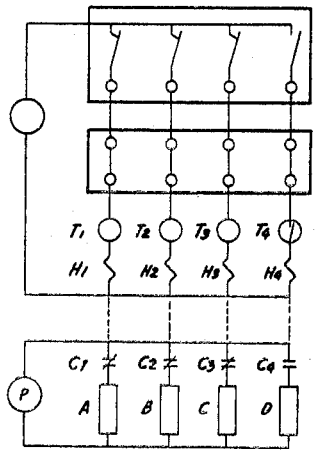

Fifteen minutes after the connections shown in FIGURE 4e have been in operation, the cycler suddenly switches back to its initial connection as shown in FIGURE 4f. In this case, three heating zones will be in operation and this represents an overload of the system. The stabilizer will immediately react to disconnect switches starting with switch number S3. As soon as this switch is open, zones A and B are energized only and the connection effectively reverts to the one started with in FIGURE 4a.

It is true that a temporary overload was experienced in FIGURE 4f, but since the stabilizer removes the load very quickly, this excess demand will not be registered on the lagged demand meter.

The above description shows that the stabilizer-cycler combination acts in such a way that no time is lost in trying to heat zones whose thermostats are open. As a result, the system will tend to utilize and send the available heating power to the zones which require it. In this simple example, it can be seen that zone A and zone B are heated for 45 minutes per hour, and zone C is heated for 30 minutes per hour and that no time is wasted in attempting to heat zone D, which is already warm enough as exhibited by its open thermostat. The heating power is also distributed as equitably as possible to the separate zones.

Should zone D now cool down so as to cause thermostat T4 to close, the system will operate in exactly the same way as shown in operation description—part 2 and each heating zone will be in operation for 30 minutes per hour.

Consider now, with respect to the following description of operation—part 4, the circuit of FIGURE 5. So far systems have been described in which an equal order of priority was required throughout. However, there are many applications where a variable priority may be desired as is shown in FIGURE 5. In this case and by way of example, it is assumed that the following loads are distributed over a five-story building:

(a) A main floor which is subject to considerable public circulation during the winter with consequent high use of its heating facilities;

(b) Floors 2, 3, 4 and 5 are also electrically heated and by their nature equal priority is required for all;

(c) Hot water facilities are also to be provided for, but it is considered that their priority is on an intermediate level. As a result, heating elements are interposed in such a way that hot water is generated before all the floors are heated 100% of the time;

(d) Snow-melting facilities have a very low order of priority and are therefore connected on the last switch of the stabilizer.

If the load conditions are such that only the first switch of the stabilizer may close, then, heating will be provided for the main floor only. If at some subsequent period, switches 1 and 2 are closed, then, the main floor will be fully heated and each of the four other floors will receive on the average 25% of the installed heating capacity.

If switches 1, 2 and 3 of the stabilizer are closed, the main floor will be fully heated and the four remaining floors will receive on the average 50% of their installed capacity.

When switches 1, 2, 3 and 4 are closed, the main floor is fully heated, the four other floors receive 50% of their installed power and, the hot water elements come into operation.

If the first 5 switches of the stabilizer are in operation, the main floor is fully heated, the four other floors receive 75% of their installed capacity, and the hot water heater is in operation.

Finally, if the load conditions are such that all the switches in the stabilizer may close, then, the snow-melting circuit will come into operation.

It is clear that the order of priority of each load can be changed to suit many different conditions simply by altering the patch-cord connections between the stabilizer, the cycler and the output terminals of the stabilizer-cycler unit.

FIGURE 6 shows with respect to the following description of the internal circuit of the cycler, one method of obtaining the switching action required of the cycler. The cycler essentially consists of a stepping relay, generally indicated at 1, which is similar to standard telephone relays in which fingers F1, F2, F3 and F4 engage contacts A1, B1, C1 and D1 a certain period of time, after which a rapid switching action is obtained so that the same fingers engage terminals D2, A2, B2 and C2, and so on moving in a horizontal direction and ultimately returning to A1, B1, C1, D1 to repeat the cycle. The stepping action is obtained by means of a relay coil M which forms part of the stepping relay.

In this diagram, terminals 1, 2, 3 and 4 would be connected to the stabilizer, and terminal N acts as a ground return. Sequential closure of the stabilizer switches will cause a voltage of 120 volts A.C. to appear first between terminals 1 and N, then 2 and N and ultimately between terminals 4 and N of the cycler. Relays H1, H2, H3 and H4 and associated contacts C1, C2, C3 and C4 are the counterparts of the same elements discussed in the previous pages. The switching rate of the stepping relay is determined by a timing circuit composed of a resistance R6 and a condenser C2 acting upon a unijunction transistor UJT which, when fired, causes a silicon controlled rectifier SCR to permit passage of current through the relay coil M. When the SCR is triggered, condenser C1 discharges through the coil M and causes fingers F1, F2, F3 and F4 to step to the next set of contacts. As soon as condenser C1 is discharged the gate of the SCR again regains control. Condenser C1 is recharged by the A.C. voltage between the terminals 1 and N (via diodes D1) and a resistance R2. The relay coils H1, H2, H3 and H4 and associated diodes D5 and D4 are arranged in this way so as to obtain a slight delay in relay action when the fingers momentarily break contact when moving from one position to the next. In other words, holding coils H do not immediately release when the fingers are in the transitional stage from one contact to the next, but remain closed due to the free-wheeling action of diodes D5.

A relay RX connected between terminals 4 and N is introduced so that when voltage appears at the last terminal of the cycler, (terminal 4 in this case) relay RX will be excited causing contact RX' to open thereby introducing an additional resistance R1 into the circuit of condenser C1. The introduction of R1 into the circuit causes a very much lower voltage to appear across C1, with the result that the energy stored in C1 is no longer sufficient to cause coil M to step. It is clear that when the last terminal of the cycler is excited, there is no point in maintaining the cycling action and in the interest of reducing unnecessary wear of the unit, this relay RX simply stops the stepping action. In the same way, if contact 1 of the cycler is not excited there is no point in cycling the loads because no power is available to heat them in any event, and it is evident that the circuit is arranged accordingly. A resistor R7 limits the maximum voltage across the unijunction transistor UJT to a safe value and a resistor R5 compensates for temperature variations. "Supp." arranged between terminal 1 and N, is a suppressor to prevent transient voltage pulses from damaging the electronic circuits.

I claim:
1. In a multiple load-control and power-distributing system having optional load priorities, the combination comprising:
 (a) a mains power source or feeder and a multiplicity of controlled loads and uncontrolled loads;
 (b) a load control apparatus controlled by said mains power source and loads connected to said load-control; said load-control comprising means for energizing and deenergizing in numerical sequence said loads connected thereto;
 (c) a switching device having a number of inputs and outputs; each of said inputs being alternately and sequentially switched to any one of said outputs so as to evenly distribute power to any one of said outputs;
 (d) wire means connecting a first number of said loads to said load-control apparatus via said outputs and inputs of said switching device and connecting a second number of said loads directly to said load-control apparatus; said loads being arranged in priority sequence corresponding to the energizing and de-energizing sequence of said load-control apparatus, and arranged so that the first energized load constitutes the first priority load and the last energized load constitutes the last priority load, and so that all of said first number of loads have equal priority and each of said second number of loads has a different priority.

2. In a system as claimed in claim 1, wherein said power source controlling said load-control apparatus consists of current transformers connected directly across a power supply line.

3. In a system as claimed in claim 1, wherein said load-control apparatus is a peak load-stabilizer and essentially includes a number of switches and output terminals connected to said switches; each of said terminals being alternately switched in and out and energized and de-energized in numerical sequence for automatically connecting and disconnecting said loads so as to maintain a predetermined and constant demand set in said load-stabilizer, and arranged such that the load connected to the first energized terminal constitutes said first priority load and the load connected to the last energized terminal constitutes said last priority load.

4. In a system as claimed in claim 1, wherein said switching device is a cycler-power distributor essentially consisting of a stepping relay, a relay coil operating said stepping relay, and a number of contact fingers successively connecting each of a number of input terminals for an identical period of time to any one of an equal number of output terminals, and arranged such that power, sequentially supplied by said load-stabilizer to said input terminals, is successively and evenly distributed to said output terminals.

5. In a system as claimed in claim 1, wherein said wire means connecting said loads in priority sequence are patch-cord connections and adapted to change the order of priority of said loads by interchanging the relative connections of said patch-cords.

6. In a system as claimed in claim 1, wherein magnetic contactors are provided between said loads and said output terminals of said load-stabilizer and connecting and disconnecting said loads in accordance with said switching in and out of said output terminals of said load-stabilizer.

7. In a system as claimed in claim 1, wherein said loads are heating elements.

8. In a system as claimed in claim 6, wherein thermostats are provided in series with said loads and magnetic contactors and effecting opening and closure of said stabilizer switches and said magnetic contactors.

9. In a system as claimed in claim 8, wherein a power source is provided in series with said load-control device, said switching device, said magnetic contactors and said thermostats.

References Cited

UNITED STATES PATENTS

| | | | |
|---|---|---|---|
| 3,196,254 | 7/1965 | Knoop | 307—41 X |
| 3,278,824 | 10/1966 | Runyon | 307—41 X |
| 3,291,998 | 12/1966 | Wildi | 307—35 |

ROBERT K. SCHAEFER, Primary Examiner

H. J. HOHAUSER, Assistant Examiner

UNITED STATES PATENT OFFICE
CERTIFICATE OF CORRECTION

Patent No. 3,489,913                        January 13, 1970

Theodore Wildi

It is certified that error appears in the above identified patent and that said Letters Patent are hereby corrected as shown below:

In the heading to the printed specification, lines 4 and 5, "Theodore Wildi, 1365 Rue de Longueuil, Quebec, Quebec, Canada" should read -- Theodore Wildi, Quebec, Quebec, Canada, assignor to Gen-Tec (1969) Inc., Quebec, Canada --.

Signed and sealed this 23rd day of February 1971.

(SEAL)

Attest:

Edward M. Fletcher, Jr.

Attesting Officer

WILLIAM E. SCHUYLER, JR.

Commissioner of Patents